(12) United States Patent
Statia et al.

(10) Patent No.: US 12,375,475 B2
(45) Date of Patent: Jul. 29, 2025

(54) CONFINING LATERAL TRAVERSAL WITHIN A COMPUTER NETWORK

(71) Applicant: Microsoft Technology Licensing, LLC, Redmond, WA (US)

(72) Inventors: Jeromy Scott Statia, Arlington, WA (US); Jeffrey Ryan Bacon, Bellevue, WA (US); Darrin Earl Curtis, Everett, WA (US); Aaron Richard Davis, Bellevue, WA (US); Douglas Anthony Rasler, Sammamish, WA (US); Elizabeth Anne Phippen, Bothell, WA (US); Satish Devan, Redmond, WA (US); Bum Su Jung, Redmond, WA (US); Daniel James Dawson, Peirson, FL (US); George Kenneth Ringer, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/699,540

(22) PCT Filed: Oct. 12, 2022

(86) PCT No.: PCT/US2022/077966
§ 371 (c)(1),
(2) Date: Apr. 8, 2024

(87) PCT Pub. No.: WO2023/069852
PCT Pub. Date: Apr. 27, 2023

(65) Prior Publication Data
US 2024/0267373 A1      Aug. 8, 2024

(30) Foreign Application Priority Data
Oct. 19, 2021   (LU) .................................. 500755

(51) Int. Cl.
*H04L 9/40* (2022.01)
*G06F 21/33* (2013.01)
(Continued)

(52) U.S. Cl.
CPC .......... *H04L 63/083* (2013.01); *G06F 21/335* (2013.01); *G06F 21/55* (2013.01);
(Continued)

(58) Field of Classification Search
None
See application file for complete search history.

(56) References Cited

U.S. PATENT DOCUMENTS 8,176,533 B1 *   5/2012   Violleau ................. H04L 67/02
                                                              705/62
8,544,068 B2     9/2013   Yates
(Continued)

FOREIGN PATENT DOCUMENTS

EP        3422237 A1    1/2019

OTHER PUBLICATIONS

Johnson et al "A Graph Analytic Metric for Mitigating Advanced Persistent Threat," IEEE, pp. 129-133 (Year: 2013).*

(Continued)

*Primary Examiner* — Luu T Pham
*Assistant Examiner* — James J Wilcox
(74) *Attorney, Agent, or Firm* — Workman Nydegger (57) ABSTRACT

Confining lateral traversal within a network. An authorization request identifies a credential, a protected first resource, and an identifier of a protected second resource for which authorization is requested. A lateral traversal policy associated with the second resource is identified, which constrains access to the second resource to only resources that belong to a subset of resources including the second resource. When it is determined that the credential is configured for access (Continued)

to the second resource, and when it is determined that the first resource belongs to the subset of resources including the second resource, an authorization token is issued, which authorizes the credential to access the second resource via the first resource. Alternatively, when it is determined that the credential is granted access to the second resource, and when it is determined that the first resource is outside of the particular subset of resources, the authorization request is denied.

20 Claims, 5 Drawing Sheets

(51) Int. Cl.
*G06F 21/55* (2013.01)
*H04L 9/32* (2006.01)

(52) U.S. Cl.
CPC .............. *H04L 9/3213* (2013.01); *H04L 9/40* (2022.05); *H04L 63/0807* (2013.01); *H04L 63/10* (2013.01); *H04L 63/104* (2013.01); *H04L 63/145* (2013.01); *G06F 2221/2125* (2013.01)

(56) References Cited

U.S. PATENT DOCUMENTS

| | | | | |
|---|---|---|---|---|
| 9,185,136 | B2* | 11/2015 | Dulkin | G06F 21/577 |
| 9,264,412 | B1* | 2/2016 | Chao | H04L 63/102 |
| 9,412,278 | B1* | 8/2016 | Gong | G08G 5/26 |
| 9,591,006 | B2* | 3/2017 | Siva Kumar | H04L 63/10 |
| 9,716,617 | B1* | 7/2017 | Ahuja | H04L 63/101 |
| 9,787,715 | B2* | 10/2017 | Touboul | H04L 63/20 |
| 9,825,978 | B2* | 11/2017 | Siva Kumar | H04L 63/083 |
| 10,200,369 | B1* | 2/2019 | Roundy | H04L 61/5007 |
| 10,225,284 | B1* | 3/2019 | Evans | H04L 63/0209 |
| 10,333,976 | B1* | 6/2019 | Yudovich | H04L 63/1416 |
| 10,333,977 | B1* | 6/2019 | Shamul | H04L 63/1491 |
| 10,367,835 | B1* | 7/2019 | Raviv | H04L 63/1425 |
| 10,419,469 | B1* | 9/2019 | Singh | H04L 43/06 |
| 10,958,662 | B1* | 3/2021 | Sole | H04L 63/0853 |
| 11,134,058 | B1* | 9/2021 | Sole | G06F 21/554 |
| 11,323,474 | B1* | 5/2022 | Agrawal | H04L 63/1416 |
| 11,368,475 | B1* | 6/2022 | Vashisht | G06F 16/9535 |
| 11,425,134 | B1* | 8/2022 | Patimer | H04L 67/562 |
| 11,457,040 | B1* | 9/2022 | Sole | H04L 63/101 |
| 11,483,339 | B1* | 10/2022 | Kaimal | H04L 63/1416 |
| 11,494,046 | B2* | 11/2022 | Han | H04L 63/0815 |
| 11,831,670 | B1* | 11/2023 | Molls | G06F 8/65 |
| 11,985,109 | B1* | 5/2024 | Van Oort | H04L 63/1408 |
| 12,001,563 | B2* | 6/2024 | Ross | H04L 63/1433 |
| 12,003,541 | B2* | 6/2024 | Shulman | H04L 63/20 |
| 2005/0149443 | A1* | 7/2005 | Torvinen | H04L 63/104 705/51 |
| 2007/0078574 | A1* | 4/2007 | Davenport | B61L 15/0027 701/19 |
| 2009/0298316 | A1* | 12/2009 | Maruyama | H04L 63/0227 439/267 |
| 2012/0074227 | A1* | 3/2012 | Ferren | G06V 40/20 396/76 |
| 2012/0280917 | A1* | 11/2012 | Toksvig | G06F 1/1626 345/173 |
| 2013/0063611 | A1* | 3/2013 | Papakipos | H04N 23/611 348/207.11 |
| 2014/0059226 | A1 | 2/2014 | Messerli et al. | |
| 2014/0123228 | A1* | 5/2014 | Brill | H04L 63/168 726/4 |
| 2014/0123273 | A1* | 5/2014 | Matus | H04M 1/66 726/16 |
| 2014/0282871 | A1* | 9/2014 | Rowland | G06F 21/60 726/3 |
| 2015/0074615 | A1* | 3/2015 | Han | H04W 12/06 715/863 |
| 2015/0149042 | A1* | 5/2015 | Cooper | B60R 25/245 701/48 |
| 2015/0223890 | A1* | 8/2015 | Miller | A61B 50/10 726/17 |
| 2016/0065601 | A1* | 3/2016 | Gong | H04L 63/145 726/23 |
| 2016/0088000 | A1* | 3/2016 | Siva Kumar | H04L 63/1416 726/23 |
| 2016/0294860 | A1* | 10/2016 | Hathaway | H04L 63/1433 |
| 2016/0308884 | A1* | 10/2016 | Kent | H04L 63/08 |
| 2016/0359905 | A1* | 12/2016 | Touboul | H04L 63/20 |
| 2017/0126717 | A1* | 5/2017 | Siva Kumar | H04L 63/1425 |
| 2017/0170973 | A1* | 6/2017 | Gill | H04L 63/0823 |
| 2017/0289191 | A1* | 10/2017 | Thioux | H04L 63/1441 |
| 2017/0337354 | A1* | 11/2017 | Drey | G06Q 50/184 |
| 2018/0019802 | A1* | 1/2018 | Teague | H04L 41/5022 |
| 2018/0088964 | A1* | 3/2018 | Hussain | G06F 9/5061 |
| 2018/0097787 | A1* | 4/2018 | Murthy | H04L 63/08 |
| 2018/0097788 | A1* | 4/2018 | Murthy | H04L 63/102 |
| 2018/0097789 | A1* | 4/2018 | Murthy | H04L 63/0227 |
| 2018/0115551 | A1* | 4/2018 | Cole | H04L 47/783 |
| 2018/0183766 | A1* | 6/2018 | Crabtree | H04L 63/0815 |
| 2018/0191684 | A1* | 7/2018 | Hoy | H04L 63/101 |
| 2018/0234459 | A1* | 8/2018 | Kung | H04L 63/0263 |
| 2018/0295154 | A1* | 10/2018 | Crabtree | H04L 63/1433 |
| 2018/0337914 | A1* | 11/2018 | Mohamad Abdul | H04L 9/3213 |
| 2018/0367548 | A1* | 12/2018 | Stokes, III | H04L 63/1416 |
| 2019/0065739 | A1* | 2/2019 | Manadhata | H04L 63/1425 |
| 2019/0065762 | A1* | 2/2019 | Kim | G06F 21/35 |
| 2019/0081963 | A1* | 3/2019 | Waghorn | G06F 21/552 |
| 2019/0089677 | A1* | 3/2019 | Ashley | H04L 63/0263 |
| 2019/0089737 | A1* | 3/2019 | Shayevitz | H04L 63/1425 |
| 2019/0097974 | A1* | 3/2019 | Martz | H04L 63/0263 |
| 2019/0097977 | A1* | 3/2019 | Martz | H04W 12/088 |
| 2019/0098020 | A1* | 3/2019 | Martz | H04L 63/145 |
| 2019/0124112 | A1* | 4/2019 | Thomas | G06F 21/45 |
| 2019/0260751 | A1* | 8/2019 | Kale | H04L 63/10 |
| 2019/0297097 | A1* | 9/2019 | Gong | G06F 21/564 |
| 2019/0312836 | A1* | 10/2019 | Phillips | H04L 9/00 |
| 2019/0334928 | A1* | 10/2019 | Sela | G06F 21/552 |
| 2020/0050749 | A1* | 2/2020 | Barboi | G06Q 20/341 |
| 2020/0052889 | A1* | 2/2020 | Bendersky | H04L 9/0861 |
| 2020/0053096 | A1* | 2/2020 | Bendersky | G06F 21/32 |
| 2020/0104891 | A1* | 4/2020 | Rule | G06Q 20/352 |
| 2020/0127994 | A1* | 4/2020 | Kukreja | G06F 21/31 |
| 2020/0145416 | A1* | 5/2020 | Mitzimberg | G06F 21/552 |
| 2020/0151611 | A1* | 5/2020 | McGavran | G09B 29/102 |
| 2020/0153846 | A1* | 5/2020 | Srivastava | H04L 63/20 |
| 2020/0236112 | A1* | 7/2020 | Pularikkal | H04L 63/1425 |
| 2020/0252416 | A1* | 8/2020 | Niv | H04L 41/0893 |
| 2020/0252422 | A1* | 8/2020 | Davis | H04L 63/102 |
| 2020/0280577 | A1* | 9/2020 | Segal | H04L 63/20 |
| 2020/0296139 | A1* | 9/2020 | Fainberg | H04L 63/205 |
| 2020/0322369 | A1* | 10/2020 | Raghuramu | H04L 63/102 |
| 2020/0356664 | A1* | 11/2020 | Maor | G06F 21/552 |
| 2020/0358804 | A1* | 11/2020 | Crabtree | H04L 63/102 |
| 2020/0358805 | A1* | 11/2020 | Segal | H04L 63/1433 |
| 2021/0084073 | A1* | 3/2021 | Crabtree | H04L 63/1441 |
| 2021/0112075 | A1* | 4/2021 | Cunningham | G06F 21/566 |
| 2021/0160237 | A1* | 5/2021 | Rozner | H04L 9/3213 |
| 2021/0176260 | A1* | 6/2021 | Pan | G06N 5/022 |
| 2021/0211447 | A1* | 7/2021 | Albero | G06N 3/08 |
| 2021/0226982 | A1* | 7/2021 | Marty | H04L 63/1441 |
| 2021/0226983 | A1* | 7/2021 | Cunningham | H04L 63/102 |
| 2021/0273957 | A1* | 9/2021 | Boyer | G06F 21/554 |
| 2021/0314250 | A1* | 10/2021 | Laplante | H04L 47/82 |
| 2021/0344723 | A1* | 11/2021 | O'Neil | G06F 21/552 |
| 2022/0006818 | A1* | 1/2022 | Cunningham | H04L 63/205 |
| 2022/0029962 | A1* | 1/2022 | Teo | H04L 63/0838 |
| 2022/0058247 | A1* | 2/2022 | Samineni | G06F 3/04845 |
| 2022/0060453 | A1* | 2/2022 | Crabtree | H04L 63/08 |
| 2022/0131901 | A1* | 4/2022 | Akella | H04L 63/20 |
| 2022/0159033 | A1* | 5/2022 | Mizrahi | H04L 63/1441 |
| 2022/0200993 | A1* | 6/2022 | Smith | H04L 63/20 |
| 2022/0201041 | A1* | 6/2022 | Keiser, Jr. | H04L 63/20 |
| 2022/0239679 | A1* | 7/2022 | Sircar | G06F 18/23213 |
| 2022/0263799 | A1* | 8/2022 | Kaidi | H04L 63/0236 |
| 2022/0272117 | A1* | 8/2022 | Maheve | H04L 63/1416 |

(56) References Cited

U.S. PATENT DOCUMENTS

| | | | | |
|---|---|---|---|---|
| 2022/0279045 | A1* | 9/2022 | Movshovitz | H04L 41/0686 |
| 2022/0345457 | A1* | 10/2022 | Jeffords | G06F 21/6218 |
| 2022/0368702 | A1* | 11/2022 | Robbins | H04L 63/1416 |
| 2023/0018210 | A1* | 1/2023 | Keiser, Jr. | H04L 63/0236 |
| 2023/0035189 | A1* | 2/2023 | Mullin | H04L 63/105 |
| 2023/0082699 | A1* | 3/2023 | Voldsund | H04L 67/564 705/2 |

OTHER PUBLICATIONS

Siadati et al "Detecting Malicious Logins in Enterprise Networks Using Visualization," IEEE, pp. 1-8 (Year: 2016).*
Al Hamin et al "Hidden Markov Model and Cyber Deception for the Prevention of Adversarial Lateral Movement," IEEE, pp. 49662-49682 (Year: 2021).*
Tian et al "Real-Time Lateral Movement Detection Based on Evidence Reasoning Network for Edge Computing Environment," IEEE Transactions on Industrial Informatics, vol. 15, No. 7, pp. 4285-4294 (Year: 2019).*
Tang et al "Policy-Based Network Access and Behavior Control Management," 2020 IEEE 20th International Conference on Communication Technology, IEEE, pp. 1102-1106 (Year: 2020).*
Zhi et al "Research on Policy-Based Access Control Model," 2009 International Conference on Networks Security, Wireless Communications and Trusted Computing, IEEE Computer Society, pp. 164-167 (Year: 2009).*
Yu et al "A Unifited Scheme for Resource Protection in Automated Trust Negotiation," IEEE Computer Society, pp. 1-13 (Year: 2003).*
Bowman et al "Detecting Lateral Movement in Enterprise Computer Networks with Unsupervised Graph AI," pp. 257-268 (Year: 2020).*
International Search Report and Written Opinion Issued in PCT Application No. PCT/US22/077966 (MS# 410539-WO-PCT), Mailed on Jan. 30, 2023, 14 Pages.
Jungles, et al., "Mitigating Pass-the-Hash (PtH) Attacks and Other Credential Theft Techniques", Retrieved From: https://www.microsoft.com/en-in/download/details.aspx?id=36036, Jan. 1, 2012, 82 Pages.
Search Report Issued in Luxemburg Patent Application No. LU500755 (MS#410539-LU01), Jul. 7, 2022, 9 pages.
Communication Under Rule 71(3) EPC Received for European Application No. 22800977.5, (MS#410539-EP01-PCT) mailed on Jul. 17, 2024, 7 pages.
Decision to grant a European patent pursuant to Article 97(1) received in European Application No. 22800977.5, (MS# 410539-EP01-PCT) mailed on Nov. 21, 2024, 2 pages.

* cited by examiner

CONFINING LATERAL TRAVERSAL WITHIN A COMPUTER NETWORK

CROSS-REFERENCE TO RELATED APPLICATIONS

The present application is a U.S. National Stage of International Application No. PCT/US2022/077966, filed on 12 Oct. 2022, designating the United States and claiming the priority of Luxembourg Patent Application No. LU500755 filed with the Luxembourg Intellectual Property Office on 19 Oct. 2021. All of the aforementioned applications are incorporated herein in their respective entirety by this reference.

TECHNICAL FIELD

The present disclosure relates to systems, methods, and devices that manage resource authorization within computer networks.

BACKGROUND

Using traditional authorization techniques, a single credential is often authorized to access two or more protected computer network resources based on either a persistent or a time-based assignment of a privilege group to the credential (where the privilege group grants access to the two or more protected resources). This single credential being authorized to access a plurality of resources is the underpinning of lateral traversal attacks, and escalation of privilege, within a computer network. For example, once this single credential has been compromised by a malicious party (e.g., due to social engineering, due to a software vulnerability, etc.), the malicious party can potentially discover one or more other protected resources in the privilege group and then use this credential to laterally traverse to any of the discovered protected resources to which the assigned privilege group grants access. Sometimes malicious parties wait years to discover another protected resource in the privilege group through observation. Once the malicious party has laterally traversed to a new system, that party may have the opportunity to compromise a new credential at the new system. When this new credential belongs to a privilege group that grants access to one or more additional systems, the malicious party can use this new credential to laterally traverse towards a further goal, such as a target credential or system of interest. Thus lateral traversal is use of a credential, compromised through access to a first protected resource, to access a second protected resource.

BRIEF SUMMARY

At least some embodiments described herein confine lateral traversal within a computer network. In particular, in embodiments, a plurality of protected resources (e.g., computer systems, services, etc.) are grouped into one or more subsets of resources. Then, for at least one protected resource that is a target of an access request, embodiments configure an authority to enforce a policy that authorizes a request for access to the target protected resource only when the access request originates from an origin protected resource that is in a same subset as the target protected resource. In other words, the authority only authenticates an access request when the access request originates within a particular subset, and when the access request is destined to this particular subset. This means that if an access request originates from a resource that is in any subset other than the subset to which the target protected resource belongs, the authority denies the access request—even if the access request includes a credential that would otherwise be validly configured for access to the target protected resource (e.g., based on a group membership).

By grouping protected resources into subsets, and by enforcing policies that restrict access across subsets, the embodiments described herein limit the lateral traversal potential of a compromised credential. In particular, when a malicious party compromises a particular resource, including compromising a credential associated with that resource, the embodiments described herein restrict that malicious party from laterally traversing to (and compromising) any protected resources or associated credentials that are outside of the subset to which this particular resource belongs. As such, the embodiments described herein are capable of limiting lateral traversal to resources within the same subset as a compromised resource. Thereby, the embodiments described herein confine lateral traversal to resources within that subset.

Technical effects of limiting lateral traversal to resources within the same subset as a compromised resource, and confining lateral traversal to resources within that subset are given. This, in turn, improves system security, by limiting the scope of protected resources that a malicious party is capable of reaching and compromising within a computer network.

In some aspects, the techniques described herein relate to a method, implemented at a computer system that includes a processor, for confining lateral traversal within a computer network, the method including: receiving an authorization request that includes (a) an authentication token that identifies a credential and a first protected resource within the computer network, and (b) an identifier of a second protected resource within the computer network for which authorization is requested; determining, based on a capability of the credential, whether or not the credential is configured for access to the second protected resource; identifying a lateral traversal policy associated with the second protected resource, the lateral traversal policy constraining access to the second protected resource to only resources within the computer network that belong to a particular subset of resources to which the second protected resource belongs; determining whether or not the first protected resource belongs to the particular subset of resources to which the second protected resource belongs; and based at least on determining that the credential is configured for access to the second protected resource, performing one of: when the first protected resource is determined to belong to the particular subset of resources to which the second protected resource belongs, issuing an authorization token that authorizes the credential to access the second protected resource via the first protected resource; or when the first protected resource is determined to be outside the particular subset of resources to which the second protected resource belongs, denying the authorization request.

In some aspects, the techniques described herein relate to a method, wherein the first protected resource is determined to belong to the particular subset of resources to which the second protected resource belongs, and the method includes the issuing the authorization token. In some aspects, the techniques described herein relate to a method, further including configuring a network to permit network communications from the first protected resource to the second protected resource.

In some aspects, the techniques described herein relate to a method, wherein the first protected resource is determined to be outside the particular subset of resources to which the second protected resource belongs, and the method includes the denying the authorization request. In some aspects, the techniques described herein relate to a method, further including logging denial of the authorization request, including logging the credential, the first protected resource, and the second protected resource. In some aspects, the techniques described herein relate to a method, further including configuring a network to deny network communications from the first protected resource to the second protected resource. In some aspects, the techniques described herein relate to a method, further including, prior to denying the authorization request, determining that no exception applies to a lateral traversal denial between the first protected resource and the second protected resource.

In some aspects, the techniques described herein relate to a method, wherein the first protected resource and the second protected resource is each one of a computer system or a network service.

In some aspects, the techniques described herein relate to a method, wherein the authentication token is a ticket-granting ticket (TGT), and the authorization token is a client-to-server ticket issued by a ticket-granting service (TGS).

In some aspects, the techniques described herein relate to a method, wherein the lateral traversal policy defines the second protected resource to be part of the particular subset of resources to which the second protected resource belongs.

In some aspects, the techniques described herein relate to a method, wherein the credential is configured for access to the second protected resource just-in-time.

In some aspects, the techniques described herein relate to a method, wherein the capability of the credential is a group membership associated with the credential.

In some aspects, the techniques described herein relate to a method, wherein determining whether or not the first protected resource belongs to the particular subset of resources to which the second protected resource belongs includes comparing a first subset membership attribute of the first protected resource with a second subset membership attribute of the second protected resource.

In some aspects, the techniques described herein relate to a method, wherein the authentication token also identifies one or more attributes of the first protected resource, and wherein the one or more attributes of the first protected resource are utilized for at least one of: (a) the determining whether or not the credential is configured for access to the second protected resource, or (b) the determining whether or not the first protected resource belongs to the particular subset of resources to which the second protected resource belongs.

In some aspects, the techniques described herein relate to a computer system for confining lateral traversal within a computer network, including: a processor; and a hardware storage device that stores computer-executable instructions that are executable by the processor to cause the computer system to at least: receive an authorization request that includes (a) an authentication token that identifies a credential and a first protected resource within the computer network, and (b) an identifier of a second protected resource within the computer network for which authorization is requested; determine, based on a capability of the credential, whether or not the credential is configured for access to the second protected resource; identify a lateral traversal policy associated with the second protected resource, the lateral traversal policy constraining access to the second protected resource to only resources within the computer network that belong to a particular subset of resources to which the second protected resource belongs; determine whether or not the first protected resource belongs to the particular subset of resources to which the second protected resource belongs; and based at least on determining that the credential is configured for access to the second protected resource, perform one of: when the first protected resource is determined to belong to the particular subset of resources to which the second protected resource belongs, issue an authorization token that authorizes the credential to access the second protected resource via the first protected resource; or when the first protected resource is determined to be outside the particular subset of resources to which the second protected resource belongs, deny the authorization request.

In some aspects, the techniques described herein relate to a computer readable media that stores computer-executable instructions that are executable by a processor to cause a computer system to confine lateral traversal within a computer network, the computer-executable instructions including instructions that are executable by the processor to cause the computer system to at least: receive an authorization request that includes (a) an authentication token that identifies a credential and a first protected resource within the computer network, and (b) an identifier of a second protected resource within the computer network for which authorization is requested; determine, based on a capability of the credential, whether or not the credential is configured for access to the second protected resource; identify a lateral traversal policy associated with the second protected resource, the lateral traversal policy constraining access to the second protected resource to only resources within the computer network that belong to a particular subset of resources to which the second protected resource belongs; determine whether or not the first protected resource belongs to the particular subset of resources to which the second protected resource belongs; and based at least on determining that the credential is configured for access to the second protected resource, perform one of: when the first protected resource is determined to belong to the particular subset of resources to which the second protected resource belongs, issue an authorization token that authorizes the credential to access the second protected resource via the first protected resource; or when the first protected resource is determined to be outside the particular subset of resources to which the second protected resource belongs, deny the authorization request.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
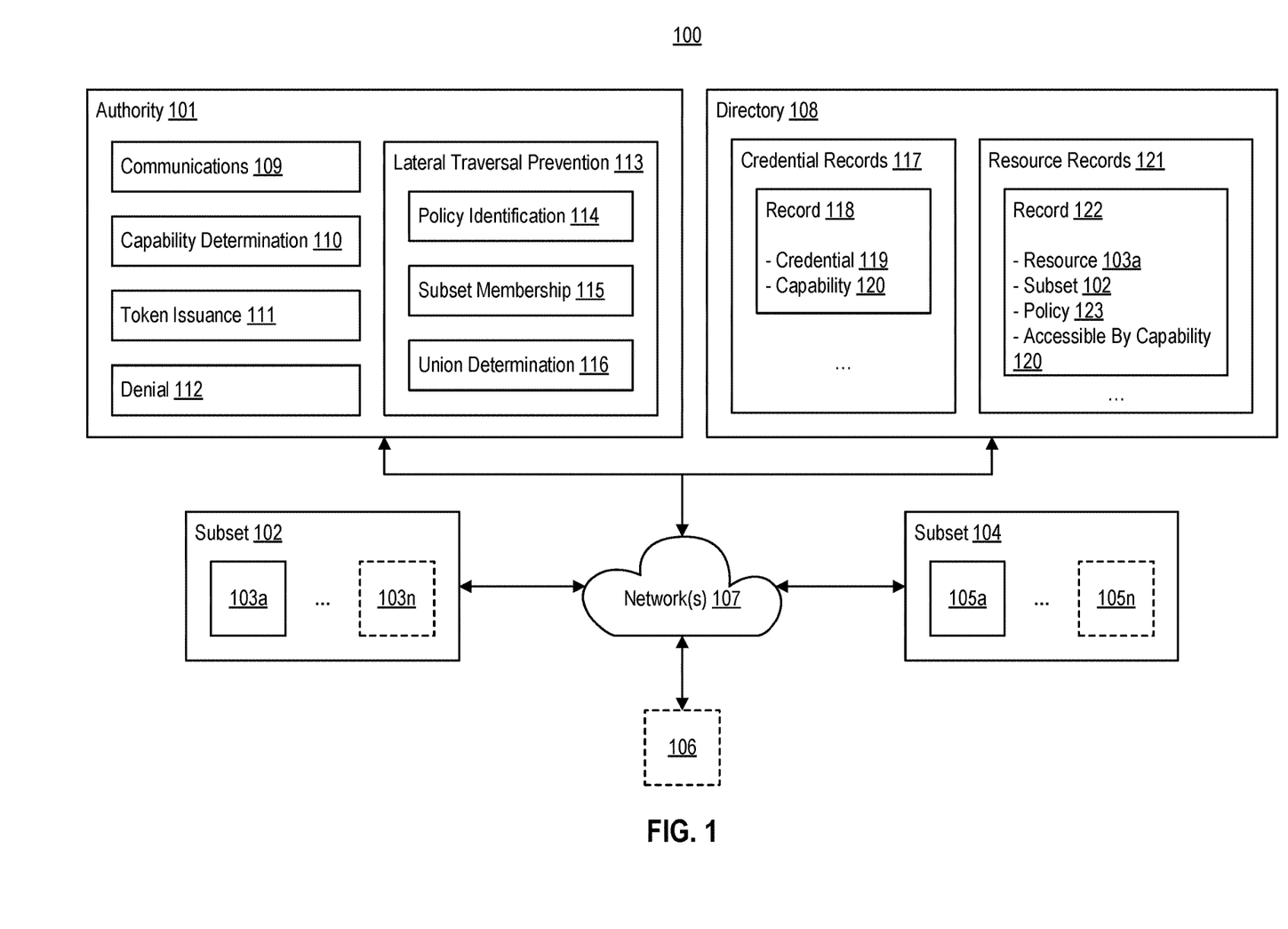
FIG. 1 illustrates an example computer architecture that facilitates confining lateral traversal within a computer network.

FIG. 1 illustrates an example computer architecture 100 that facilitates confining lateral traversal within a computer network. As shown in FIG. 1, computer architecture 100 comprises an authority 101 connected via a network 107 (or a plurality of networks) to a plurality of protected resources (e.g., protected resource 103a to protected resource 103n arranged into a subset 102, protected resource 105a to protected resource 105n arranged into a subset 104, and/or protected resource 106 that is outside of any subset). In some embodiments, the authority 101 is a ticket-granting service (TGS) that operates according to the Kerberos protocol. However, as will be appreciated by one of ordinary skill in the art, the principles described herein can be applied a broad variety of authentication/authorization technologies beyond Kerberos. In embodiments, a protected resource can comprise any resource from which an authorization request can originate, and/or any resource that can be a target of an authorization request. For example, in embodiments, a protected resource comprises a computer system or a network service.

As shown in FIG. 1, the authority 101 communicates with (or, in some embodiments, comprises) a directory 108 which stores at least credential records 117 and resource records 121. In some embodiments, the directory 108 stores these records using an object data model, such as a data model defined by the X.500 standards electronic directory services, a data model used by ACTIVE DIRECTORY from MICROSOFT CORPORATION, etc. In embodiments, the directory 108 is accessible using the Lightweight Directory Access Protocol (LDAP), Active Directory Lightweight Directory Services (AD LDS), etc. However, as will be appreciated by one of ordinary skill in the art, the principles described herein can be applied a broad variety of technologies beyond those named herein.

For purposes of describing the embodiments herein, the credential records 117 are shown as including at least a record 118 defining a credential 119 that is assigned a capability 120 (e.g., an assigned group membership). Additionally, the resource records 121 are shown as including at least a record 122 for protected resource 103a. This record 122 defines a subset membership for the protected resource 103a (i.e., subset 102), a policy 123, and an indication the protected resource 103a is accessible by credentials having capability 120 (e.g., credentials that have been assigned to a particular group). Notably, while—for clarity—FIG. 1 illustrates separate lines within record 122 for the subset definition and the policy 123, in some embodiments the policy 123 includes the subset definition and/or presence of the subset definition implies presence of the policy 123 (e.g., as a Kerberos claim). Although not shown, in embodiments the resource records 121 include additional records for other protected resources (e.g., protected resource 103n, protected resource 105a, protected resource 105n) that, in embodiments, comprise analogous subset definitions and polices that authorize requests for access to those protected resource only when those requests originate from another resource that is part of the same subset as that resource.

In embodiments, the authority 101 is configured to utilize the directory 108 to process an authorization request received from an origin protected resource, and in which the authorization request is a request for authorization to access a target protected resource. In order to confine lateral traversal among protected resources, the authority 101 is configured to enforce a policy that authorizes a request for access to a target protected resource only when the access request originates from an origin protected resource that is in the same subset as the target protected resource. For example, the authority 101 is configured to enforce a policy 123 that is associated with protected resource 103a, which authorizes requests for access to the protected resource 103a only when those requests originate from another resource (e.g., protected resource 103n) that is also a part of subset 102. This means the authority 101 is configured to deny any requests for access to protected resource 103a from resources that are outside of subset 102 (e.g., protected resource 106 that is outside of any assigned subset, protected resources 105a to 105n that are assigned to subset 104, etc.)—even if that request identifies a credential (e.g., credential 119) that would otherwise be validly configured for access to protected resource 103a (e.g., based on capability 120).

Notably, by configuring the authority 101 to enforce policies that authorize requests for access to a given target protected resource only when that access request originates from an origin protected resource that is in the same subset as the target protected resource, the authority 101 limits the lateral traversal potential of a compromised credential. For example, if a malicious party compromises protected resource 106 and credential 119, the authority 101 restricts that malicious party from using credential 119 to laterally traverse from protected resource 106 to protected resource 103a and thus prevents the malicious party from compromising protected resource 103a (or any additional credentials associated with protected resource 103a, but not with protected resource 106). Similarly, if a malicious party compromises protected resource 105a and credential 119, the authority 101 restricts that malicious party from using credential 119 to laterally traverse from protected resource 105a to protected resource 103a and thus prevents the malicious party from compromising protected resource 103a (or any additional credentials associated with protected resource 103a, but not with protected resource 105a).

FIG. 1 illustrates details of the authority 101, including example components (e.g., a communications component 109, a capability determination component 110, a token issuance component 111, a denial component 112, and a lateral traversal prevention component 113) that facilitate confining lateral traversal within a computer network, according to some embodiments. It will be appreciated that the depicted components—including their identity, subcomponents, and arrangement—are presented merely as an aid in describing various embodiments of the authority 101, as described herein, and that these components are nonlimiting to how software and/or hardware might implement various embodiments described herein, or of the particular functionality thereof.

In embodiments, the communications component 109 communicates with protected resources over the network 107, which can include receiving access requests from protected resources, and sending authorization tokens and/or denial messages to those protected resources in response. In some embodiments, the communications component 109 also communicates with the directory 108 to obtain records, such as credential records 117 and/or resource records 121.

In embodiments, the capability determination component 110 identifies a capability associated with a credential that is included in an access request, and determines if that capability configures the credential for access to a target protected resource. For example, since credential 119 is assigned the capability 120 (e.g., an administrative group membership), that credential 119 is configured for access to protected resource 103*a* (e.g., since record 122 indicates that protected resource 103*a* is accessible by capability 120).

In embodiments, when the authority 101 has determined that an origin protected resource is authorized to access a target protected resource (e.g., in response to receipt of an access request at the communications component 109), the token issuance component 111 generates an authorization token for the origin protected resource. Conversely, when the authority 101 has determined that an origin protected resource is not authorized to access the target protected resource (e.g., in response to receipt of an access request at the communications component 109), the denial component 112 generates a denial message.

In embodiments, the lateral traversal prevention component 113 operates to confine lateral traversal among protected resources, based on a subset membership of (or lack thereof) of an origin protected resource, based on a subset membership of a target protected resource, and based on a policy (associated with the target protected resource) that requests for access to the target protected resource should only be authorized when the access request originates from a resource that is within the a same subset as the target protected resource.

The lateral traversal prevention component 113 is shown as including a policy identification component 114. In embodiments, the policy identification component 114 identifies and/or determines whether a lateral traversal policy exists for a given target protected resource. The lateral traversal prevention component 113 is also shown as including a subset membership component 115. In embodiments, the subset membership component 115 determines to which subset each of the origin protected resource and the target protected resource belong. In some embodiments, presence of a subset membership within a resource record (e.g., record 122) implies presence of a lateral traversal policy (e.g., as a Kerberos claim). Thus, in some embodiments, policy identification component 114 and the subset membership component 115 are a single common component.

The lateral traversal prevention component 113 is also shown as including a union determination component 116. In embodiments, the union determination component 116 determines whether the authority 101 can grant access to the target protected resource, based on a union between a credential capability of a requesting credential and a lateral traversal policy restricting access to a target protected resource to only those origin protected resources that are in a common subset with the target protected resource. In embodiments, the union determination component 116 determines whether a credential capability (e.g., group membership) configures the credential for access to the target protected resource (e.g., is the credential configured for access to the target protected resource?), and whether an origin protected resource from which an access request was sent belongs to the same subset as a target protected resource (e.g., is the origin protected resource in the same subset as the target protected resource?). In embodiments, this union determines whether the authority 101 can grant access to the target protected resource, as shown in Table 1:

TABLE 1

| Credential Configured for Access? | Origin in Same subset? | Grant Access |
|---|---|---|
| Yes | Yes | Yes |
| Yes | No | No |
| No | Yes | No |
| No | No | No |

Operation of the components of the authority 101 are now further described in connection with FIG. 2, which illustrates a flow chart of an example method 200 for confining lateral traversal within a computer network. In embodiments, instructions for implementing method 200 are encoded as computer-executable instructions stored on a hardware storage device that are executable by a processor to cause a computer system (e.g., authority 101) to perform method 200.

Figure 3A:
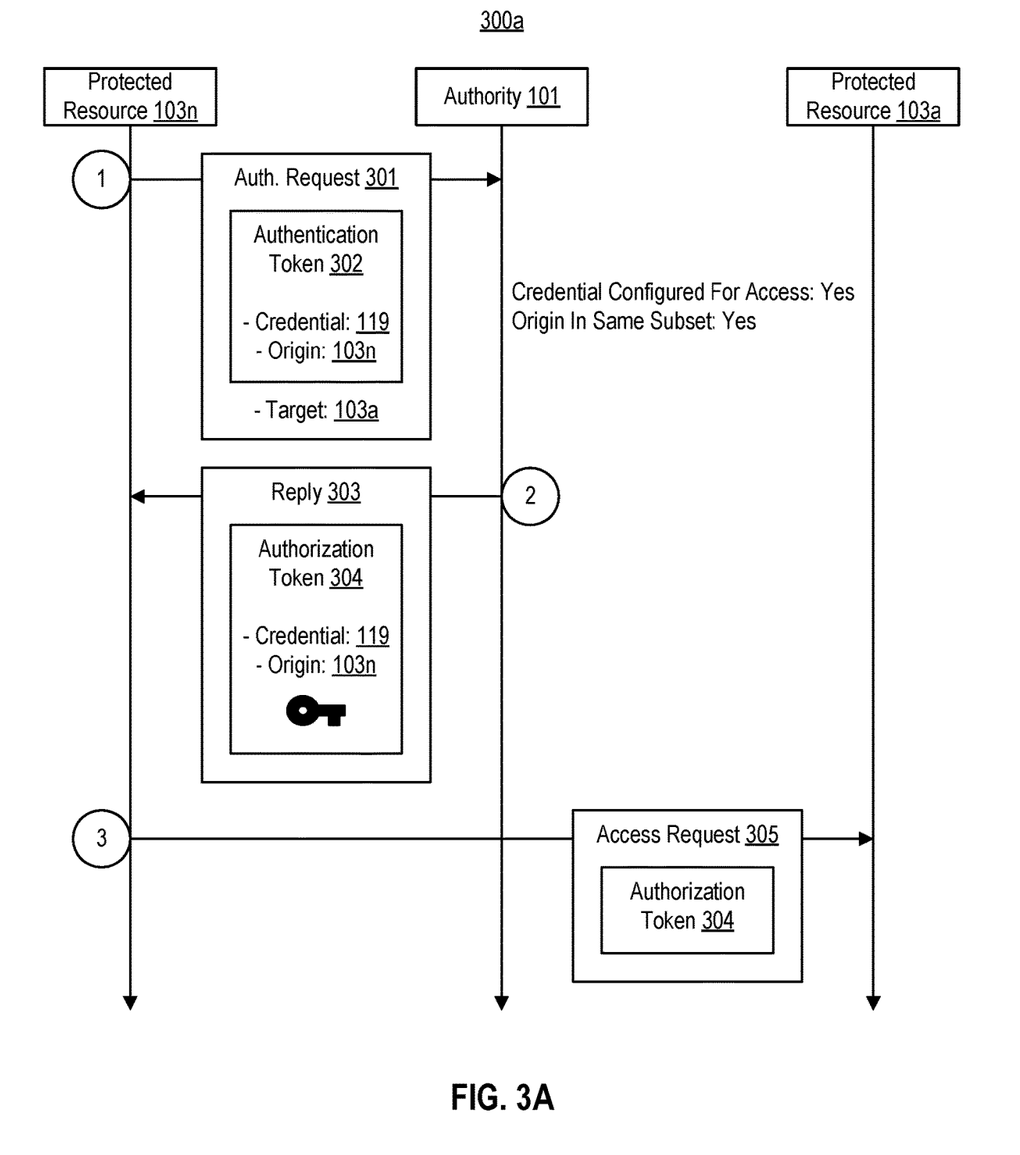
FIG. 3A illustrates a communications timing diagram showing authorization of an access request sent by an origin protected resource that is in the same subset as a target protected resource.
Figure 3B:
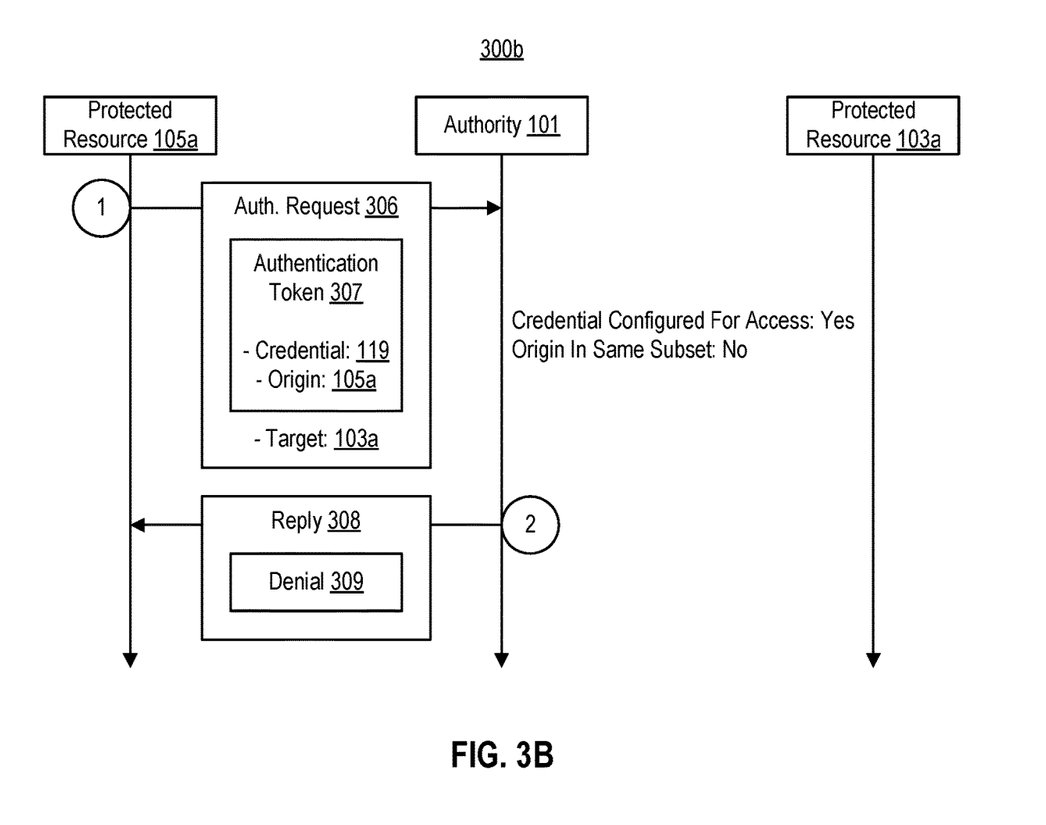
FIG. 3B illustrates a communications timing diagram showing denial of an access request sent by an origin protected resource that is in a different subset than a target protected resource.
Figure 3C:
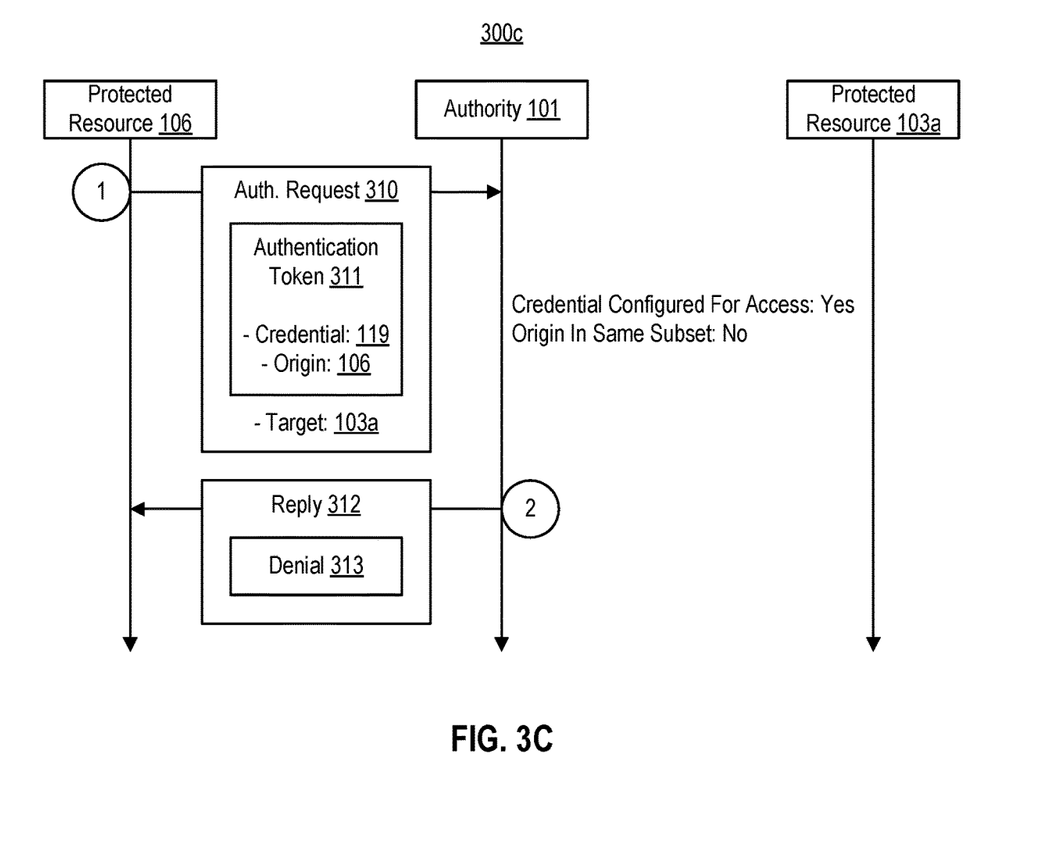
FIG. 3C illustrates a communications timing diagram showing denial of an access request sent by an origin protected resource that is apart from any subset.

Operation of the components of the authority 101 are also further described in connection with FIGS. 3A-3C, which each illustrates an example communications timing diagram demonstrating handling, by the authority 101, of an access request that is sent by an origin protected resource with an intent to access a target protected resource. In particular, FIG. 3A illustrates an example 300*a* of a communications timing diagram showing authorization of an access request sent by an origin protected resource that is in the same subset as a target protected resource; in FIG. 3A, protected resource 103*n* (subset 102) is the origin protected resource, and protected resource 103*a* (subset 102) is the target protected resource. Additionally, FIG. 3B illustrates an example 300*b* of a communications timing diagram showing denial of an access request sent by an origin protected resource that is in a different subset than a target protected resource; in FIG. 3B, protected resource 105*a* (subset 104) is the origin protected resource, and protected resource 103*a* (subset 102) is the target protected resource. Finally, FIG. 3C illustrates an example 300*c* of a communications timing diagram showing denial of an access request sent by an origin protected resource that is apart from any subset; in FIG. 3C, protected resource 106 (no assigned subset) is the origin protected resource, and protected resource 103*a* (subset 102) is the target protected resource.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 2:
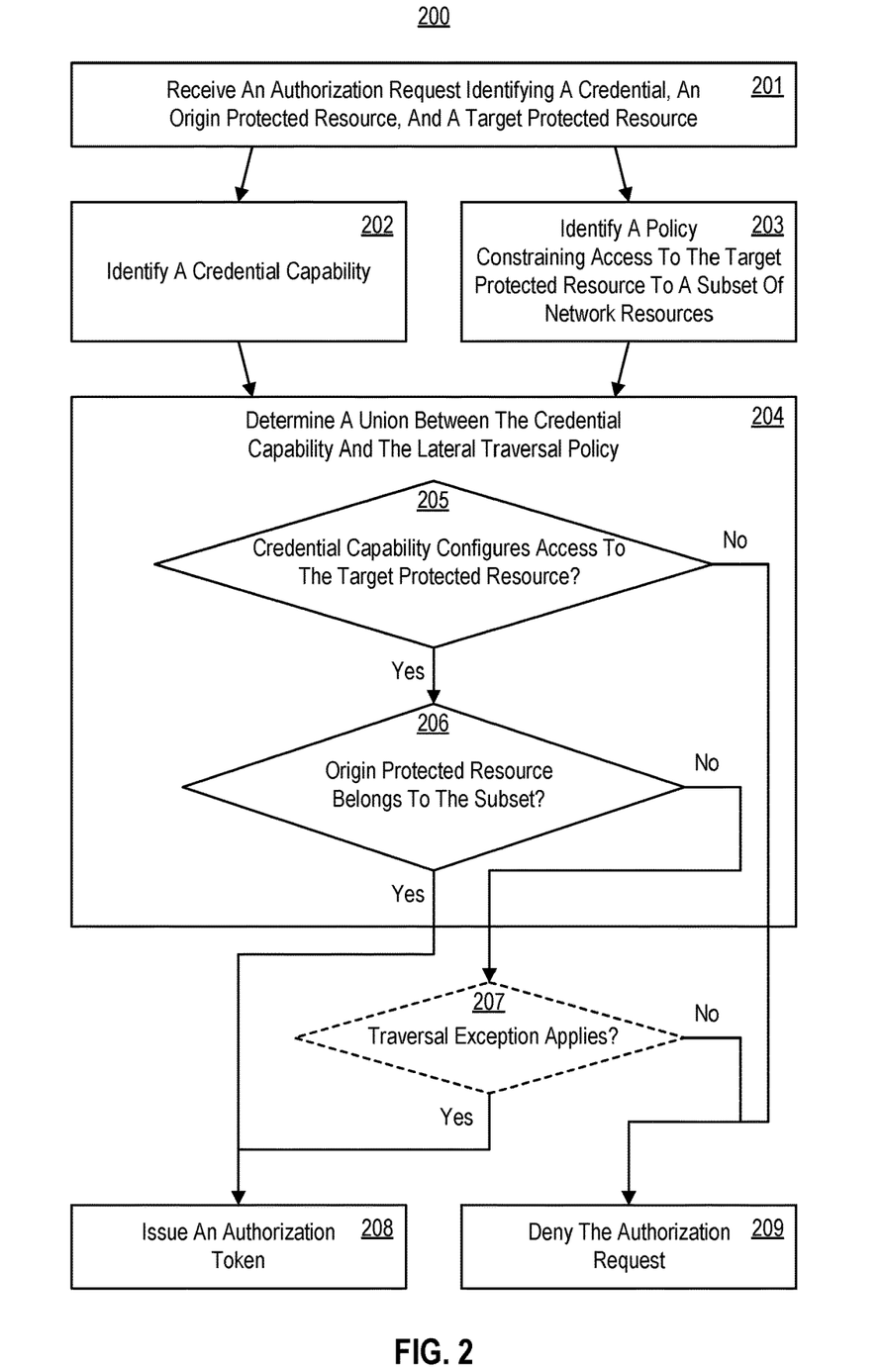
FIG. 2 illustrates a flow chart of an example method for confining lateral traversal within a computer network.

Referring to FIG. 2, in embodiments, method 200 comprises an act 201 of receiving an authorization request identifying a credential, an origin protected resource, and a target protected resource. In some embodiments, act 201 comprises receiving an authorization request that includes (a) an authentication token that identifies a credential and a first protected resource within the computer network, and (b)

an identifier of a second protected resource within the computer network for which authorization is requested. In embodiments, the first protected resource and the second protected resource is each one of a computer system or a network service.

Referring to FIGS. 1 and 3A, in example 300a, at time (1) protected resource 103n sends an authorization request 301 to authority 101 over network 107; the communications component 109 at authority 101, in turn, receives that authorization request 301. As shown, in at least one embodiment, the authorization request 301 comprises an authentication token 302 that, in turn, comprises an identity of credential 119 and an identity of protected resource 103n as the origin of the request. Additionally, the authorization request 301 also comprises an identity of the protected resource 103a as the intended target of the request.

Referring to FIGS. 1 and 3B, in example 300b, at time (1) protected resource 105a sends an authorization request 306 to the authority 101 over the network 107; the communications component 109 at authority 101, in turn, receives that authorization request 306. As shown, in at least one embodiment, the authorization request 306 comprises an authentication token 307 that, in turn, comprises an identity of credential 119 and an identity of protected resource 105a as the origin of the request. Additionally, the authorization request 306 also comprises an identity of the protected resource 103a as the intended target of the request.

Referring to FIGS. 1 and 3C, in example 300c, at time (1) protected resource 106 sends an authorization request 310 to the authority 101 over the network 107; the communications component 109 at authority 101, in turn, receives that authorization request 310. As shown, in at least one embodiment, the authorization request 310 comprises an authentication token 311 that, in turn, comprises an identity of credential 119 and an identity of protected resource 106 as the origin of the request. Additionally, the authorization request 310 also comprises an identity of the protected resource 103a as the intended target of the request.

As mentioned, in embodiments the authority 101 is a TGS that operates according to the Kerberos protocol. In these embodiments, the authentication token is a ticket-granting ticket (TGT) that was previously issued to the origin protected resource (e.g., protected resource 103n in example 300a, protected resource 105a in example 300b, or protected resource 106 in example 300c) by authority 101 (or some other entity) as part of authentication of credential 119 at that origin protected resource. However, it will be appreciated by one of ordinary skill in the at that many forms of authentication tokens and authentication requests could be utilized in order implement the principles described herein.

Notably, in some embodiments, an authentication token (e.g., authentication token 302 in example 300a, authentication token 307 in example 300b, or authentication token 311 in example 300c) comprises one or more attributes of the origin protected resource. In embodiments, these attributes are used by the authority 101 to make policy decisions. Thus, in some embodiments of act 201, the authentication token also identifies one or more attributes of the first protected resource. In one embodiment, these attributes include an attribute specifying a subset membership of the origin protected resource, and this attribute used (e.g., in act 206) to determine whether the origin protected resource is in the same subset as the target protected resource. Thus, in some embodiments, the one or more attributes of the first protected resource are utilized for the determining whether or not the first protected resource belongs to the particular subset of resources to which the second protected resource belongs. For example, in example 300a authentication token 302 may include an attribute specifying subset 102 (e.g., because the origin protected resource is protected resource 103n within subset 102), in example 300b authentication token 307 may include an attribute specifying subset 104 (e.g., because the origin protected resource is protected resource 103n within subset 104), and in example 300c the authentication token 311 may include an attribute indicating no subset (e.g., because the origin protected resource is protected resource 106 with no assigned subset). In some embodiments, an attribute specifying a subset membership of the origin protected resource is in the form of a Kerberos claim.

Referring to FIG. 2, in embodiments, method 200 also comprises an act 202 of identifying a credential capability. In some embodiments, act 202 comprises identifying a capability of the credential, the capability configuring the credential for access to one or more protected resources. For example, referring to FIGS. 1 and 3A-3C, the capability determination component 110 identifies a capability (e.g., capability 120) associated with the credential (e.g., credential 119) identified in the corresponding authorization request (e.g., authorization request 301 in example 300a, authorization request 306 in example 300b, or authorization request 310 in example 300c) received by the communications component 109 in act 201. In embodiments, the capability determination component 110 identifies the capability by performing a lookup in the directory 108 (e.g., an X.500 directory, ACTIVE DIRECTORY, etc.).

In some embodiments, the capability is an attribute, such as a privilege group membership (e.g., administrators), that is assigned to the credential. Thus, in some embodiments of method 200, the capability of the credential is a group membership associated with the credential.

In some embodiments the capability is assigned to the credential persistently, while in other embodiments the capability is assigned to the credential on a time-based basis. For example, in these latter embodiments, the capability is assigned to the credential "just-in-time" during an attempt to access a target protected resource (e.g., protected resource 103a) using the credential, along with an expiration time period after which the capability is removed from the credential. Thus, in some embodiments of method 200, the credential is configured for access to the second protected resource just-in-time.

Referring to FIG. 2, in embodiments, method 200 also comprises an act 203 of identifying a policy constraining access to the target protected resource to a subset of network resources. In some embodiments, act 203 comprises identifying a lateral traversal policy associated with the second protected resource, the lateral traversal policy constraining access to the second protected resource to only resources within the computer network that belong to a particular subset of resources to which the second protected resource belongs.

For example, referring to FIGS. 1 and 3A-3C, the policy identification component 114 identifies a policy (e.g., policy 123) associated with the target protected resource (e.g., protected resource 103a) that was identified in the corresponding authorization request (e.g., authorization request 301 in example 300a, authorization request 306 in example 300b, or authorization request 310 in example 300c) received by the communications component 109 in act 201. In embodiments, the policy identification component 114 identifies the policy by performing a lookup in the directory 108 (e.g., an X.500 directory, ACTIVE DIRECTORY, etc.).

As mentioned previously, in some embodiments the policy 123 includes a subset definition (e.g., that protected resource 103a is in subset 102). Thus, in some embodiments of method 200 the lateral traversal policy defines the second protected resource to be part of the particular subset of resources to which the second protected resource belongs. In other embodiments presence of the subset definition implies presence of the policy 123.

Notably, act 202 and act 203 are illustrated as being performed in parallel, indicating that there is no particular ordering required between act 202 and act 203. Thus, in various embodiments, act 202 and act 203 are performed in parallel, or in serial (in either order).

Referring to FIG. 2, in embodiments, method 200 also comprises an act 204 of determining a union between the credential capability and the lateral traversal policy. As shown in FIG. 2, in some embodiments, act 204 comprises an act 205 of determining (e.g., by the capability determination component 110) whether the credential capability configures access to the target protected resource (e.g., is the credential configured for access to the target protected resource?), and an act 206 of determining (e.g., by the subset membership component 115) whether the origin protected resource belongs to the subset (e.g., is the origin protected resource in the same subset as the target protected resource?). Based on these determinations, act 204 results in either a determination of a grant or a denial of access to the target protected resource by the union determination component 116, as shown in Table 1. Notably, act 205 and act 206 are illustrated as being performed in serial, with act 205 occurring prior to act 206. However, in alternate embodiments act 205 and act 206 could be performed in reverse order, or even in parallel.

In some embodiments, act 205 comprises determining, based on a capability of the credential, whether or not the credential is configured for access to the second protected resource. Referring to FIGS. 1 and 3A-3C, in each of examples 300a, 300b, and 300c the capability determination component 110 determines that credential 119 is configured for access to protected resource 103a (i.e., "Yes" from act 205). In embodiments, this determination is based on the credential 119 having capability 120, and based on the protected resource 103a being accessible by capability 120 (i.e., as indicated in record 122).

As discussed in connection with act 201, in some embodiments, the authentication token (e.g., authentication token 302 in example 300a, authentication token 307 in example 300b, or authentication token 311 in example 300c) comprises one or more attributes of the origin protected resource (e.g., protected resource 103n in example 300a, protected resource 105a in example 300b, or protected resource 106 in example 300c), including an attribute specifying a subset membership of the origin protected resource. In these embodiments, the capability determination component 110 uses this attribute as part of determining whether or not the credential is configured for access to the second protected resource. Thus, in some embodiments of method 200, one or more attributes of the first protected resource are utilized for the determining whether or not the credential is configured for access to the second protected resource.

In some embodiments, act 206 comprises determining whether or not the first protected resource belongs to the particular subset of resources to which the second protected resource belongs. In embodiments, determining whether or not the first protected resource belongs to the particular subset of resources to which the second protected resource belongs in act 206 comprises comparing a first subset membership attribute of the first protected resource with a second subset membership attribute of the second protected resource.

Referring to FIGS. 1 and 3A, in example 300a the subset membership component 115 determines that protected resource 103n belongs to the same subset of resources to which protected resource 103a belongs (i.e., both of protected resource 103n and protected resource 103a are in subset 102), and that the origin protected resource is thus in the same subset as the target protected resource (i.e., "Yes" from act 206).

Based on the outcomes of act 205 and act 206, in example 300a act 204 results in a determination of a grant of access to protected resource 103a by the union determination component 116, based on a determination that credential 119 is configured for access to protected resource 103a (i.e., "Yes" from act 205), and based on a determination that protected resource 103n belongs to the same subset of resources to which protected resource 103a belongs (i.e., "Yes" from act 206).

Referring to FIGS. 1 and 3B, in example 300b the subset membership component 115 determines that protected resource 105a does not belong to (i.e., is outside of) the subset of resources to which protected resource 103a belongs (i.e., protected resource 105a is in subset 104, while protected resource 103a is in subset 102), and that the origin protected resource is thus outside of the target protected resource's subset (i.e., "No" from act 206).

Based on the outcomes of act 205 and act 206, in example 300b act 204 results in a determination of a denial of access to protected resource 103a by the union determination component 116, based on a determination that credential 119 is configured for access to protected resource 103a (i.e., "Yes" from act 205), and based on a determination that protected resource 105a is outside of a subset of resources to which protected resource 103a belongs (i.e., "No" from act 206).

Referring to FIGS. 1 and 3C, in example 300c the subset membership component 115 determines that protected resource 106 does not belong to (i.e., is outside of) the subset of resources to which protected resource 103a belongs (i.e., protected resource 106 is in no assigned subset), and that the origin protected resource is thus outside of the target protected resource's subset (i.e., "No" from act 206).

Based on the outcomes of act 205 and act 206, in example 300c act 204 results in a determination of a denial of access to protected resource 103a by the union determination component 116, based on a determination that credential 119 is configured for access to protected resource 103a (i.e., "Yes" from act 205), and based on a determination that protected resource 106 is outside of a subset of resources to which protected resource 103a belongs (i.e., "No" from act 206).

In some embodiments, the authority 101 permits definitions of exceptions that bypass enforcement of the lateral traversal policy (and thereby permit an access from a resource outside of a subset to which the target protected resource belongs, even when the lateral traversal policy would dictate otherwise). Thus, referring to FIG. 2, method 200 may comprise an act 207 of determining if a traversal exception applies. In some embodiments, act 207 comprises, prior to denying the authorization request, determining that no exception applies to a lateral traversal denial between the first protected resource and the second protected resource. If act 207 is present, then when a traversal exception does apply method 200 proceeds to issuance of an authorization token at act 208 (i.e., "Yes" from act 207); otherwise, method 200 proceeds to a denial of the authorization request at act 209 (i.e., "No" from act 207).

For example, as an exception to the determination of act 204, as shown in FIG. 2 some embodiments that include act 207 may grant access to the target protected resource when the credential capability is determined to configure access to the target protected resource (i.e., "Yes" from act 205), even if the origin protected resource is determined to be outside of the target protected resource's subset (i.e., "No" from act 206). In embodiments, this exception is based on a identifying a specifically-configured exception (e.g., stored at the authority 101 or at the directory 108), such as an entry on allow list. In embodiments, this entry includes specification of a particular origin protected resource that, as an exception, can access a particular target protected resource even though it is outside of the target protected resource subset. In embodiments, this entry also includes specification of at least one credential that is permitted to use the exception. In some embodiments, a credential that is permitted to use the exception can do so regardless of an assigned capability, while in other embodiments a credential that is permitted to use the exception can do so only when it is assigned a particular capability (e.g., as specified in the entry).

Referring to FIG. 2, in embodiments, method 200 also comprises an act 208 of issuing an authorization token. In some embodiments, act 208 comprises, based at least on determining that the credential is configured for access to the second resource (i.e., "Yes" from act 205), and when the first protected resource is determined to belong to the particular subset of resources to which the second protected resource belongs (i.e., "Yes" from act 206), issuing an authorization token that authorizes the credential to access the second protected resource via the first protected resource. Technical effects of issuance of an authorization token in act 208 include authorizing and enabling the origin protected resource to initiate a communications session with the target protected resource (e.g., by sending the authorization token to the target protected resource).

Referring to FIG. 3A, in example 300a the capability determination component 110 determines in act 205 that credential 119 is configured for access to protected resource 103a (i.e., "Yes" from act 205). Further, in example 300a the subset membership component 115 determines in act 206 that protected resource 103n belongs to the same subset of resources to which protected resource 103a belongs, and that the origin protected resource is thus in the same subset as the target protected resource (i.e., "Yes" from act 206). Thus, act 204 results in a determination of a grant of access to protected resource 103a. As a result, and as shown in FIG. 2, method 200 proceeds to act 208 of issuing an authorization token by the token issuance component 111. For example, in FIG. 3A, at time (2) the authority 101 sends a reply 303 to the protected resource 103n over the network 107. As shown, in embodiments, the reply 303 comprises an authorization token 304 which, in embodiments, comprises the authentication token 302 plus a signature by the authority 101 (as indicated by a key in the authorization token 304). As shown at time (3), in embodiments the protected resource 103n uses this authorization token 304 to send an access request 305 to the protected resource 103a.

In some embodiments, the authorization token is a client-to-server ticket issued by a TGS, according to the Kerberos protocol. However, it will be appreciated by one of ordinary skill in the at that many forms of authorization tokens could be utilized in order implement the principles described herein.

Notably, in some embodiments, in addition to issuing an authorization token at act 208, method 200 also comprises configuring a network to permit network communications from the first protected resource to the second protected resource. For example, embodiments may configure a network firewall service to allow network packets to pass from the first protected resource to the second protected resource, configure a network tunneling service to allow the establishment of a network tunnel (e.g., an IP Security tunnel) between the first protected resource to the second protected resource, and the like. In embodiments, this has a technical effect of permitting the communication of network packets from the first protected resource to the second protected resource.

Referring to FIG. 2, in embodiments, method 200 also comprises an act 209 of denying the authorization request. In some embodiments, act 209 comprises, based at least on determining that the credential is configured for access to the second protected resource (i.e., "Yes" from act 205), and when the first protected resource is determined to be outside the particular subset of resources to which the second protected resource belongs (i.e., "No" from act 206), denying the authorization request. In some embodiments, method 200 also comprises determining that no exception applies (i.e., act 207) prior to reaching act 209. Technical effects of denying the authorization request in act 209 include preventing the origin protected resource from being able to initiate a communications session with the target protected resource. Additionally, technical effects of denying the authorization request in act 209 include preventing a lateral traversal from origin protected resource to a target protected resource, since that origin protected resource is outside of a subset of resources to which the target protected resource belongs. As a result, technical effects of denying the authorization request in act 209 include preventing escalation of privilege attacks.

Referring to FIG. 3B, in example 300b the capability determination component 110 determines in act 205 that credential 119 is configured for access to protected resource 103a (i.e., "Yes" from act 205). Further, in example 300b the subset membership component 115 determines in act 206 that protected resource 105a is outside of the subset of resources to which protected resource 103a belongs, and that the origin protected resource is thus outside of the target protected resource's subset (i.e., "No" from act 206). Thus, act 204 results in a determination of a denial of access to protected resource 103a. As a result, and as shown in FIG. 2, method 200 proceeds to act 209 of denying the authorization request by the denial component 112. For example, in FIG. 3B, at time (2) the authority 101 sends a reply 308 to the protected resource 105a over the network 107. As shown, in embodiments, the reply 303 comprises a denial 309, such as a message, an error code, etc. Here, operation of the lateral traversal prevention component 113 results in an access denial determination, even though the credential 119 would otherwise authorize access to protected resource 103a. Thus, as a technical effect, a lateral traversal from subset 104 to subset 102, and a potential privilege escalation, has been prevented.

Referring to FIG. 3C, in example 300c the capability determination component 110 determines in act 205 that credential 119 is configured for access to protected resource 103a (i.e., "Yes" from act 205). Further, in example 300c the subset membership component 115 determines in act 206 that protected resource 106 is outside of the subset of resources to which protected resource 103a belongs, and that the origin protected resource is thus outside of the target protected resource's subset (i.e., "No" from act 206). Thus, act 204 results in a determination of a denial of access to protected resource 103a. As a result, and as shown in FIG. 2, method 200 proceeds to act 209 of denying the authorization request by the denial component 112. For example, in FIG. 3C, at time (2) the authority 101 sends a reply 312 to the protected resource 106 over the network 107. As shown, in embodiments, the reply 312 comprises a denial 313, such as a message, an error code, etc. Here, operation of the lateral traversal prevention component 113 results in an access denial determination, even though the credential 119 would otherwise authorize access to protected resource 103a. Thus, as a technical effect, a lateral traversal to subset 102 from a resource outside of any subset, and a potential privilege escalation, has been prevented.

In some embodiments, the authority 101 also logs the denial of the authorization request, such as into a log file stored in system memory on a computer readable media. This can include logging one or more of the credential, the first protected resource, and the second protected resource. Thus, in some embodiments, method 200 further comprises logging denial of the authorization request, including logging the credential, the first protected resource, and the second protected resource. This has a technical effect of providing documentary evidence of an attempted lateral traversal.

In some embodiments, in addition to denying the authorization request at act 209, method 200 also comprises configuring a network to deny network communications from the first protected resource to the second protected resource. For example, embodiments may configure a network firewall service to deny communications between the first protected resource to the second protected resource, configure a network tunneling service to deny the establishment of a network tunnel (e.g., an IP Security tunnel) between the first protected resource to the second protected resource, and the like. In embodiments, this has a technical effect of preventing the communication of network packets from the origin protected resource to the target protected resource. Additionally, this prevents a malicious party from attempting to exploit software vulnerabilities at the target protected resource.

Accordingly, the embodiments described herein confine lateral traversal within a computer network based on grouping a plurality of protected resources (e.g., computer systems, services, etc.) into one or more subsets of resources. Then, for at least one protected resource that is a target of an access request, the embodiments described herein configure an authority to enforce a policy that authorizes a request for access to the target protected resource only when the access request originates from an origin protected resource that is in a same subset as the target protected resource. By grouping protected resources into subsets, and by enforcing policies that restrict access across subsets, the embodiments described herein limit the lateral traversal potential of a compromised credential. This has technical effects of limiting lateral traversal to resources within the same subset as a compromised resource, and confining lateral traversal to resources within that subset. This, in turn, improves system security, by limiting the scope of protected resources that a malicious party is capable of reaching and compromising within a computer network.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. Such embodiments may include a data processing device comprising means for carrying out one or more of the methods described herein; a computer program comprising instructions which, when the program is executed by a computer, cause the computer to carry out one or more of the methods described herein; and/or a computer-readable medium comprising instructions which, when executed by a computer, cause the computer to carry out one or more of the methods described herein. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty subset, and thus "set" is defined as a non-empty subset, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, for confining lateral traversal within a computer network, the method comprising:
   receiving an authorization request that includes (a) an authentication token that identifies a credential and a first protected resource within the computer network, and (b) an identifier of a second protected resource within the computer network for which authorization is requested;
   determining, based on a capability of the credential, that the credential is configured for access to the second protected resource and is valid for accessing the second protected resource, wherein the capability of the credential is a group membership associated with the credential;
   identifying a lateral traversal policy associated with the second protected resource, the lateral traversal policy:
      defining the second protected resource to be part of a particular subset of resources to which the second protected resource belongs; and
      constraining access to the second protected resource to only resources within the computer network that belong to the particular subset of resources to which the second protected resource belongs;
   determining that the first protected resource does not belong to the particular subset of resources to which the second protected resource belongs; and
   denying the authorization request based on the first protected resource not belonging to the particular subset of resources to which the second protected resource belongs, even though the credential is valid for accessing the second protected resource.

2. The method of claim 1, further comprising logging denial of the authorization request, including logging the credential, the first protected resource, and the second protected resource.

3. The method of claim 1, further comprising configuring a network to deny network communications from the first protected resource to the second protected resource.

4. The method of claim 1, further comprising, prior to denying the authorization request, determining that no exception applies to a lateral traversal denial between the first protected resource and the second protected resource.

5. The method of claim 1, wherein the authentication token is a ticket-granting ticket (TGT), and the authorization token is a client-to-server ticket issued by a ticket-granting service (TGS).

6. The method of claim 1, wherein the credential is configured for access to the second protected resource just-in-time.

7. The method of claim 1, wherein determining whether or not the first protected resource belongs to the particular subset of resources to which the second protected resource belongs comprises comparing a first subset membership attribute of the first protected resource with a second subset membership attribute of the second protected resource.

8. The method of claim 1, wherein the authentication token also identifies one or more attributes of the first protected resource, and wherein the one or more attributes of the first protected resource are utilized for at least one of:
(a) the determining whether or not the credential is configured for access to the second protected resource, or
(b) the determining whether or not the first protected resource belongs to the particular subset of resources to which the second protected resource belongs.

9. The method of claim 1, wherein the method further comprises determining the capability of the credential by performing a lookup in a directory.

10. A computer system for confining lateral traversal within a computer network, comprising:
a processor; and
a hardware storage device that stores computer-executable instructions that are executable by the processor to cause the computer system to at least:
receive an authorization request that includes (a) an authentication token that identifies a credential and a first protected resource within the computer network, and (b) an identifier of a second protected resource within the computer network for which authorization is requested;
determine, based on a capability of the credential, that the credential is configured for access to the second protected resource and is valid for accessing the second protected resource, wherein the capability of the credential is a group membership associated with the credential;
identify a lateral traversal policy associated with the second protected resource, the lateral traversal policy:
defining the second protected resource to be part of a particular subset of resources to which the second protected resource belongs; and
constraining access to the second protected resource to only resources within the computer network that belong to the particular subset of resources to which the second protected resource belongs;
determine that the first protected resource does not belong to the particular subset of resources to which the second protected resource belongs; and
deny the authorization request based on the first protected resource not belonging to the particular subset of resources to which the second protected resource belongs, even though the credential is valid for accessing the second protected resource.

11. The computer system of claim 10, wherein the authentication token is a ticket-granting ticket (TGT), and the authorization token is a client-to-server ticket issued by a ticket-granting service (TGS).

12. The computer system of claim 10, wherein the credential is configured for access to the second protected resource just-in-time.

13. The computer system of claim 10, wherein the computer-executable instructions are also executable by the processor to cause the computer system to log denial of the authorization request, including logging the credential, the first protected resource, and the second protected resource.

14. The computer system of claim 10, wherein the computer-executable instructions are also executable by the processor to cause the computer system to configure a network to deny network communications from the first protected resource to the second protected resource.

15. The computer system of claim 10, wherein the computer-executable instructions are also executable by the processor to cause the computer system to, prior to denying the authorization request, determine that no exception applies to a lateral traversal denial between the first protected resource and the second protected resource.

16. The computer system of claim 10, wherein determining whether or not the first protected resource belongs to the particular subset of resources to which the second protected resource belongs comprises comparing a first subset membership attribute of the first protected resource with a second subset membership attribute of the second protected resource.

17. The computer system of claim 10, wherein the authentication token also identifies one or more attributes of the first protected resource, and wherein the one or more attributes of the first protected resource are utilized for at least one of:
(a) the determining whether or not the credential is configured for access to the second protected resource, or
(b) the determining whether or not the first protected resource belongs to the particular subset of resources to which the second protected resource belongs.

18. A computer readable hardware storage device that stores computer-executable instructions that are executable by a processor to cause a computer system to confine lateral traversal within a computer network, the computer-executable instructions including instructions that are executable by the processor to cause the computer system to at least:
receive an authorization request that includes (a) an authentication token that identifies a credential and a first protected resource within the computer network, and (b) an identifier of a second protected resource within the computer network for which authorization is requested;
determine, based on a capability of the credential, that the credential is configured for access to the second protected resource and is valid for accessing the second protected resource, wherein the capability of the credential is a group membership associated with the credential;
identify a lateral traversal policy associated with the second protected resource, the lateral traversal policy:
defining the second protected resource to be part of a particular subset of resources to which the second protected resource belongs; and
constraining access to the second protected resource to only resources within the computer network that belong to the particular subset of resources to which the second protected resource belongs;

determine that the first protected resource does not belong to the particular subset of resources to which the second protected resource belongs; and deny the authorization request based on the first protected resource not belonging to the particular subset of resources to which the second protected resource belongs, even though the credential is valid for accessing the second protected resource.

19. The computer readable hardware storage device of claim 18, wherein the instructions are also executable by the processor to cause the computer system to log denial of the authorization request, including logging the credential, the first protected resource, and the second protected resource.

20. The computer readable hardware storage device of claim 18, wherein the instructions are also executable by the processor to cause the computer system to configure a network to deny network communications from the first protected resource to the second protected resource.

* * * * *